United States Patent
Sureaud et al.

(10) Patent No.: US 7,320,432 B2
(45) Date of Patent: Jan. 22, 2008

(54) DEVICE FOR OPTICAL READING AND RADIOFREQUENCY ENCODING ADAPTABLE AT THE OUTPUT OF AN IDENTIFICATION LABELS PRINTER

(75) Inventors: Jean Sureaud, St Laurent du Var (FR); Guillaume Brandin, Roquefort les Pins (FR); Elias Sabbah, Mougins (FR)

(73) Assignee: ASK S.A., Valbonne (FR)

( * ) Notice: Subject to any disclaimer, the term of this patent is extended or adjusted under 35 U.S.C. 154(b) by 0 days.

(21) Appl. No.: 11/490,183

(22) Filed: Jul. 21, 2006

(65) Prior Publication Data
US 2007/0017988 A1    Jan. 25, 2007

(30) Foreign Application Priority Data
Jul. 22, 2005    (FR) .................................. 05 07825

(51) Int. Cl.
*G06K 7/10* (2006.01)
(52) U.S. Cl. ................................. 235/462.43
(58) Field of Classification Search ................ 235/440, 235/462.43
See application file for complete search history.

(56) References Cited

U.S. PATENT DOCUMENTS

| | | | |
|---|---|---|---|
| 5,378,883 A * | 1/1995 | Batterman et al. ..... | 235/462.21 |
| 5,820,281 A * | 10/1998 | Hill et al. .................... | 400/621 |
| 6,975,834 B1* | 12/2005 | Forster ..................... | 455/277.2 |
| 7,055,750 B2* | 6/2006 | Carrender .............. | 235/472.01 |
| 7,114,654 B2* | 10/2006 | Chapman et al. ...... | 235/462.01 |
| 2002/0113707 A1* | 8/2002 | Grunes et al. ........... | 340/572.1 |
| 2004/0032443 A1* | 2/2004 | Moylan et al. ................ | 347/19 |
| 2004/0164864 A1* | 8/2004 | Chung et al. ............ | 340/572.7 |

FOREIGN PATENT DOCUMENTS

| EP | 1 538 552 | 6/2005 |
|---|---|---|
| EP | 1538552 A2 * | 6/2005 |

* cited by examiner

Primary Examiner—Michael G. Lee
Assistant Examiner—Paultep Savusdiphol
(74) Attorney, Agent, or Firm—James C. Lydon

(57) ABSTRACT

The invention concerns a device (10) featuring an optical reader (12) for printed codes capable of transforming the information of a code printed on an object such as a label into digital data, the object being equipped with a radiofrequency system featuring an antenna (27) and a chip (28) connected together. According to a main characteristic of the invention, the device features a radiofrequency dialog unit (15) designed to encode the chip (28) with digital data read from the printed code and to compare the digital data encoded in the chip with information from the printed code.

9 Claims, 2 Drawing Sheets

DEVICE FOR OPTICAL READING AND RADIOFREQUENCY ENCODING ADAPTABLE AT THE OUTPUT OF AN IDENTIFICATION LABELS PRINTER

TECHNICAL FIELD

This invention concerns the bar code readers for luggage identification labels or others and concerns in particular an optical reading and radiofrequency encoding device adaptable to the output of an identification label printer.

BACKGROUND ART

The identification labels used for luggage in aircraft are all equipped with a bar code. The bar code contains data and information for identifying the luggage, which thus allows the luggage to be indexed and identified during check-in, loading and unloading. The bar code can contain identification information about the luggage, its owner, flight number, etc. However, for reliability and security reasons, the identification system of such labels tends to be replaced by a radiofrequency system featuring an electronic chip containing the information and an antenna used to exchange data with a remote reader also equipped with an antenna, the chip and the antenna being connected together. The radiofrequency type identification technique can be substituted with or be added to the more traditional bar code identification techniques. The problem, however, that emerges from such a technique is the difficulty and the cost in installing the radiofrequency type read/write system for such labels at all airports of the world, which demonstrates the need to retain two types of reading systems. The labels known as "mixed", therefore equipped simultaneously with a bar code and a radiofrequency type system, will thus apply to the entire luggage identification market.

The problem that arises then is the modification of the read/write system currently installed at airports, which enables only bar code identification labels to be read. Therefore, there exist devices capable of creating a bar code to transpose the coded information and to encode the chip with the same information. There are printers capable of generating luggage identification labels, these labels been adapted to be read optically as well as with a radiofrequency system. These printers are capable of printing a bar code on an identification label equipped with a radiofrequency system and simultaneously encoding the chip. This type of printer could thus replace the current bar code identification label printers available on the market. One of the significant problems of this solution resides in the cost that such a replacement represents. This replacement seems all the more inappropriate since bar code identification label printers for luggage are reliable and efficient.

SUMMARY OF THE INVENTION

This is why the object of the invention is to provide a portable device that can be adapted to the output of standard bar code printers, capable of reading the bar code of labels produced by the printer and encoding the chip of the same label with the information read without any modification and interaction being required with the system installed to which the printer is attached.

The purpose of the invention is thus a device featuring an optical reader for printed codes capable of transforming the information of a code printed on an object such as a label into digital data, the object being equipped with a radiofrequency system featuring an antenna and a chip connected together. According to a main characteristic of the invention, the device includes a radiofrequency dialog unit designed to encode the chip with digital data read from the printed code and to compare the digital data encoded in the chip with information in the printed code.

BRIEF DESCRIPTION OF THE DRAWINGS

The purposes, objects and characteristics of the invention will become more apparent from the following description when taken in conjunction with the accompanying drawings in which.

DETAILED DESCRIPTION OF THE INVENTION

Figure 1:
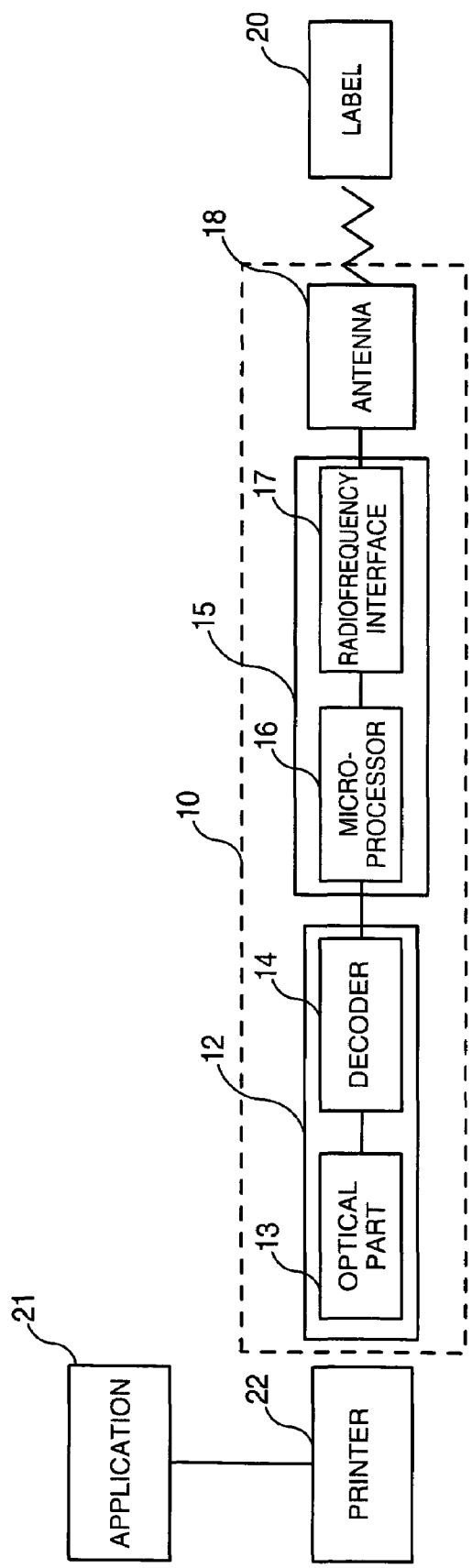
FIG. 1 represents a block diagram and a schematic diagram of the device according to the invention.

According to the schematic diagram of FIG. 1, the device 10 according to the invention is placed at the output of a printer 22, which is itself connected to an application 21 such as one for luggage check-in on behalf of an airline company. The printer is built into a check-in counter and is connected remotely to the database of the airline company. The printer used to print the printed code labels such as a bar code, outputs labels that are directly used by an operator. The labels are also equipped with a radiofrequency system featuring an antenna and an electronic chip connected together. The device according to the invention features a bar code reader 12 that does not include moving mechanical parts, thus preferably of the CCD type (Charge transfer device). The CCD sensor optical reader includes two distinct parts, an optical part 13 designed to read the bar code and a logical part 14 designed to decode the information read (decoder) in order to convert it into digital data. The optical part 13 features a lighting device designed to illuminate the bar code that can be made up of one or more light emitting diodes to illuminate with visible or infrared light the bar code and a device to detect the light reflected by the code. In this manner, the light signal reflected by the bar code is then transformed into an electrical signal by the CCD sensor thanks to a phototransistor-based system. The electrical signal is then processed by the decoder 14 so that the information contained in the bar code can be transmitted to the chip in the form of digital information. To this end, a radiofrequency dialog unit 15 processes, owing to a microprocessor 16, the digital signal that comes from the decoder 14, i.e. from the logical part of the reader. A radiofrequency interface 17 that plays the role of a transceiver receives the information from the microprocessor 16 and transmits it to the electronic chip 28 in the label 20. Conversely, the RF interface 17 is capable of retrieving identification information contained in labels and transmitting it to the microprocessor 16. The radiofrequency interface 17 thus enables the modulation and demodulation of signals in order to ensure the transmission of data to the label 20 and the reading of data from the label. In this manner, the information corresponding to the bar code is encoded in the chip. The information is exchanged thanks to an antenna 18 located in the device 10 according to the invention communicating with the antenna of the label 20. The decoder 14 can also form part of the microprocessor 16 without deviating from the scope of the invention.

The device 10 features a user interface connected to the radiofrequency dialog unit 15 so that the user can immediately detect faulty transactions between the label 20 and the device 10.

Figure 2:
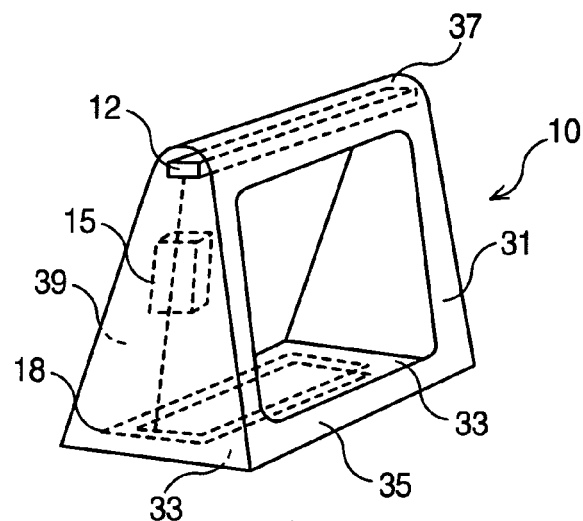
FIG. 2 represents a perspective view of the device according to the invention.

According to FIG. 2, the device 10 according to the invention features a large opening 31 preferably rectangular in shape for an object such as a luggage label to pass through. The device 10 as shown, has a lower portion or base 33 that is larger than the upper portion 37, a front face 35 and a rear face 39 designed to press against the face of the printer from where the label comes out. The antenna 18 is housed preferably in the base 33 of the device 10 parallel to one of the sides of the opening 31. The optical part 13 of the optical reader 12 is placed preferably opposite the antenna 18, along the upper part 37 of the device facing the base 35 of the device. The optical part 13 and the antenna 18 are thus located opposite one another and on either side of the opening 31, the antenna 18 being situated on the side of the opening where the width of the device is the largest. The optical part 13 is positioned in such a way that the light beam produced by the lighting device forms a plane parallel to the plane of the rear face 39 of the device. The orientation of the light beam can, however, be modified thanks to a lighting device installed on a swiveling joint.

The power supply of the device 10, not shown in the figures, can be provided by a built-in battery or a connection to the mains.

Figure 3:
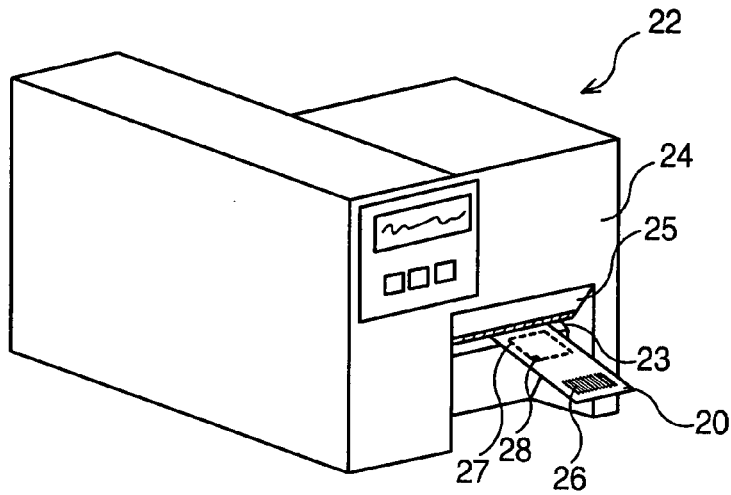
FIG. 3 represents a perspective view of the luggage label printer.

The bar code label printer 22 is shown in perspective in FIG. 3. It has on its front face 24 an opening or output 23 from where the printed label 20 comes out. The output 23 can be located on an inclined part 25 with respect to the rest of the front face, the angle between the front face 24 and the inclined part 25 being generally less than or equal to 45°. The label 20 generally comes out perpendicular to the face 25 of the printer. According to the printer model, the label is automatically cut when it comes out or else an operator cuts it out by pressing it along a cutting edge designed for this purpose and generally located along the top edge of the opening 23. The label 20 features a bar code 26 placed parallel to the small side of the label, an antenna 27 and a chip 28 connected together.

Figure 4:
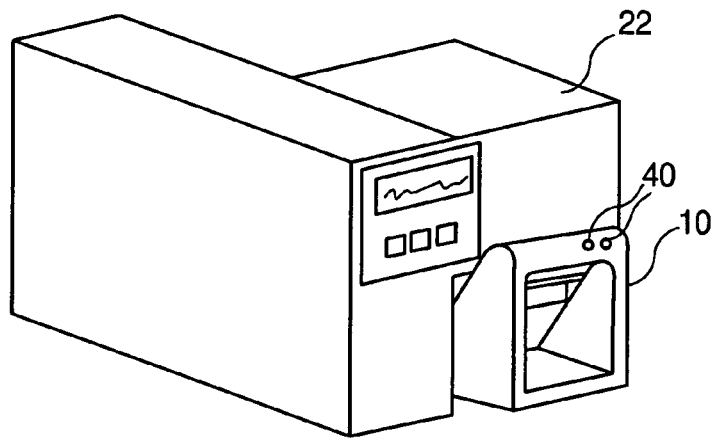
FIG. 4 represents a perspective view of the device according to the invention in its operational position with the printer.

FIG. 4 represents a perspective view of the printer 22 and the device 10 according to the invention in operational position. The device 10 is placed against the printer 22 in such a way that the opening 31 is positioned around the output 23 for labels so that no part of the device 10 obstructs the output of labels. The rear face 39 of the device 10 is pressed against the face 25 of the printer on which is located the output 23 for labels so that the light beam produced by the lighting device is directed parallel to the face 25. In this manner, the light beam is directed perpendicular to the labels coming out of the printer from the output 23 located on the plane 25. The shape of the device 10 is adapted so that it adjusts itself against the printer 22 near the output of labels without obstructing their output. The device 10 is placed on the support on which the printer is placed as shown in FIG. 4 or it can be installed sliding along a base placed near the printer or it can also be fixed directly on the printer thanks to attachment systems such as suction cups. When the device 10 is placed on the support on which the printer is placed, it can also include attachment systems such as suction cups designed to ensure that the device is maintained in proper position with respect to the printer. When the device 10 is in place, the angle between the base plane of the device and the plane 25 of the printer including the output 23 for labels is between 45° and 90°. In this way, at the printer output, the labels form an angle between 0° and 45° with the plane of the antenna 18 located in the plane of the base of the device.

The upper side of the opening 31, that is to say the one in which the optical reader 12 is housed, is then situated above the output 23 parallel to it. In this configuration, the device 10 must not interfere with the cutting of the label when it is done manually by an operator.

During operation, when a bar code label is printed by the printer 22, it is ejected from the output 23, the bar code first. As soon as the label begins to come out of the printer, it passes through the opening 31 of the device 10 in such a way that the information and data of the bar code are read first by the optical reader 12. The information and the data of the label's bar code are then transformed into electrical signals by the CCD sensor then into digital data by the decoder 14. While the label has still not come out completely from the printer, the information from the decoder is transmitted to the label by the radiofrequency dialogue unit 15. The information transmitted to the label is checked immediately afterwards. For this purpose, an interrogation signal is sent by the transceiver of the radiofrequency dialogue unit 15 to the label so that the data contained in the chip of the label is read and compared with the data read from the bar code stored in the microprocessor memory 16. The user interface consists of, for example, one or two indicator lamps 40 indicating, thanks to a color code, if the information contained in the chip of the label complies with the information read.

The time required for the exchange of data is short, in the order of 100 to 300 ms, one third of the time being required for the exchange of data by radiofrequency. Since the label must remain within the electromagnetic field of the antenna of the reader during the entire transaction time, the antenna of the reader must be sized in such a way that this condition is always fulfilled whatever the output speed of labels. The output speed of labels from the printer can reach a high speed in the order of 20 cm/s. In the most unfavorable cases in terms of rapidity of the transaction, where the antenna is located very close to the printed code, and for an output speed of labels of 20 cm/s, the label will have to be "viewed" by the reader over 6 cm.

The bar code of the label 20 can be replaced by readable characters, in this case the optical reader 12 is an OCR (Optical Character Reader) and this possibility does not deviate from the scope of the invention. Furthermore, the direction of the bar code or the characters recorded on the label can be perpendicular to the larger side of the label. Generally, the optical reader 12 is a reader capable of transforming the information of the code printed on an object such as a label 20 into digital data.

According to a first embodiment of the invention, the operating frequency of the device is 13.56 MHz as defined in the ISO standards 14443 and 15693. In this case, the magnetic type antennas 18 and 27, feature one or more turns and the exchange of data between the two antennas 18 and 27 is optimal when the two antennas are parallel, thus the electromagnetic field provided by the antenna 18 of the device closes perpendicular to the plane of the label.

According to a variant of the first embodiment of the invention, the antenna 18 of the device 10 can be located in the front face 35 of the device 10 so that the turns of the antenna surround the opening 31. In the case, for example, where the labels form an angle of 45° with the base plane of the device 10 when they come out of the printer 22, the angle between the planes of the antennas 27 and 18 is then equal to approximately 45°. The exchange of data between the label and the device 10 is then possible.

According to another variant of the first embodiment of the invention, the antenna 18 features two turn groups in which the first group of one or more turns is located in the base plane 33 of the device 10 and a second group of one or more turns is located in the front face 35 of the device 10 so that the two turn groups are located on two planes forming an angle between 45 and 90°. The directions of winding of the two turn groups are the same so that an electromagnetic field with an optimized orientation with respect to the label is produced. Actually, the label passes through the opening 31 of the device 10 by making an angle between 0° and 45° with the base 33 of the device due to the inclined orientation of the front face of the printer where the output 23 of labels is located. Consequently, in the opening 31 at the area of the label 20 passage, there exists an electromagnetic field whose component perpendicular to the label (thus the most useful component) has a value that is the resultant of components caused by the two turn groups and which is thus more important than the component perpendicular to the label of each turn group taken separately.

This variant of the first embodiment has the advantage of ensuring the communication between the label and the device according to the invention whatever be the printer and particularly whatever be the direction taken by the label when it comes out of the printer. Actually, the electromagnetic coupling between the label and the device will be minimum if the angle between the two antennas is perpendicular. This can occur if the output plane of labels 25 from the printer is perpendicular to the base plane 35 of the device 10 in which the antenna is housed. In this configuration, the label may not be detected by the device 10 and communication between the label and the device may fail. As a result, the combination of two turn groups forming a non-zero angle with each other guarantees the communication between the label and the device 10 whatever the geometrical configuration of the printer.

According to a second embodiment of the invention, the working frequencies of the device 10 are situated in the Ultra High Frequency (UHF) range in the order of a GHz (European and American frequency in the 860-960 MHz range and frequency of 2.45 GHz according to the ISO 18001 standard). In this case, the antenna 18 is located preferably in the largest part of the device 10 thus in the lower part or base 33 as shown in FIG. 2. Furthermore, the antenna 18 will have to be of a low range in order to exchange data with the label coming out of the printer, thus the one located closest to the antenna 18.

Generally, the device according to the invention presents the advantage of fitting into an existing system without requiring any modification of the latter. Located at the output of a traditional identification label printer where the data is recorded as a printed code (readable characters or bar code), the labels being of the contactless radiofrequency type, the device according to the invention helps transcribe the printed information to the chip of the radiofrequency system and check it.

Similarly, located at the output of a mixed label printer, that is to say a printer capable of printing a bar code or other type of coded characters and capable of encoding a radiofrequency chip, the device according to the invention enables the data contained in the bar code and the radiofrequency chip to be read and to compare it in order to check its compliance.

Furthermore, the device according to the invention has the advantage of being entirely independent with respect to the system in which it is inserted, whatever the printer or application of the system.

In addition, the device according to the invention being portable has the advantage of being easily shifted from one check-in counter to another. In this manner, the airline company is not compelled to equip all its printers with the device according to the invention and may as well equip only a part of its fleet of printers.

The invention claimed is:

1. A system comprising
a label equipped with a radiofrequency system comprising an antenna and a chip connected together,
in combination with a device comprising
an optical reader for printed codes capable of transforming information from a code printed on said label into digital data,
a radiofrequency dialogue unit designed to encode the chip with digital data read from the printed code and to compare the digital data encoded in the chip with the information in the printed code,
wherein the device includes a rear face adapted and designed to press against an identification label printer and an opening through which the label passes as soon as it comes out from the printer,
wherein said optical reader includes an optical part designed to read the code and a logical part designed to decode the information read and to transform it into digital data,
with the proviso that said device can encode the chip of the label with information read from the code of the same label without any interaction with the identification label printer being required.

2. The system according to claim 1, wherein said optical part further comprises a lighting device designed to illuminate the printed code and a device for detecting light reflected by the code.

3. The system according to claim 1, further comprising a microprocessor capable of processing the digital data from the logical part and a radiofrequency interface included in said radiofrequency dialog unit and designed to transmit the information processed by said microprocessor to the chip of the label via an antenna.

4. The system according to claim 3, wherein said antenna and said optical part are installed on either side of the opening.

5. The system according to claim 3, wherein said antenna comprises two turn groups, a first turn group being located in a base plane of the device and a second turn group being located in a front face of the device so that the two turn groups are located on two planes forming an angle between 45 and 135°.

6. The system according to claim 1, further comprising a user interface.

7. The system according to claim 1, further comprising systems for attachment to the printer.

8. The system according to claim 1, wherein a working frequency is in the order of 13.56 MHz.

9. The system according to claim 1, wherein a working frequency is in the Ultra High Frequency range and thus greater than 868 MHz.

* * * * *